Nov. 1, 1966  R. E. HOLDEN ETAL  3,281,895
APPARATUS FOR CUTTING AND EXPANDING PLASTIC MEMBERS
Filed Nov. 9, 1964  2 Sheets-Sheet 1
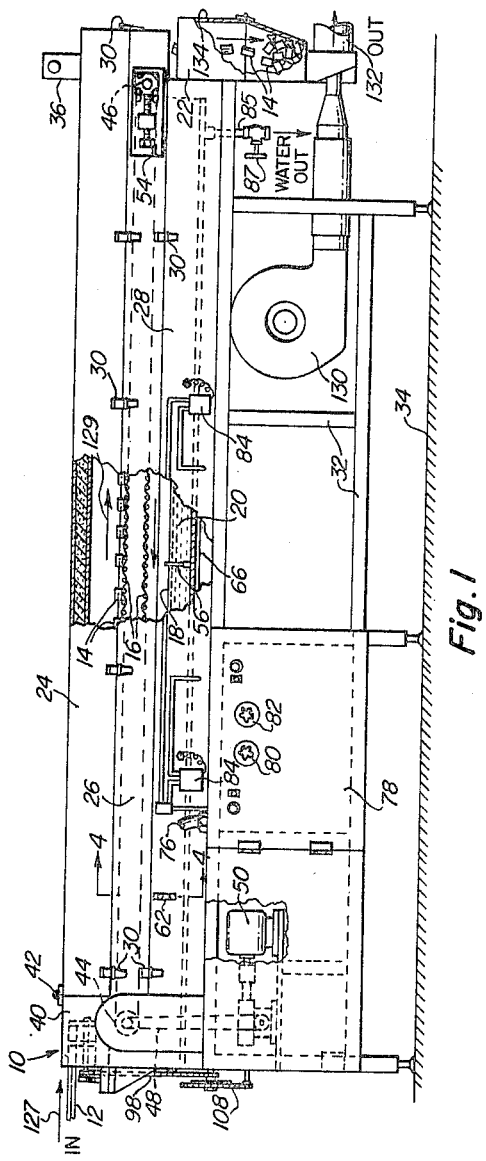
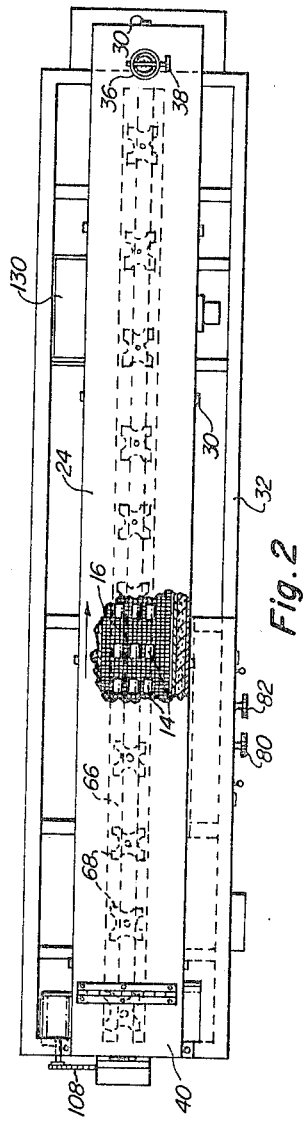
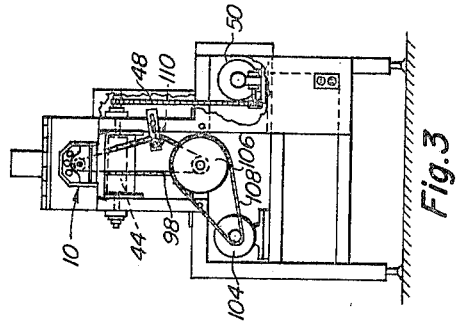
ROBERT E. HOLDEN
JAMES E. MORROW
INVENTORS.
BY BUCKHORN, BLORE, KLARQUIST & SPARKMAN
ATTORNEYS Nov. 1, 1966  R. E. HOLDEN ETAL  3,281,895
APPARATUS FOR CUTTING AND EXPANDING PLASTIC MEMBERS
Filed Nov. 9, 1964  2 Sheets-Sheet 2
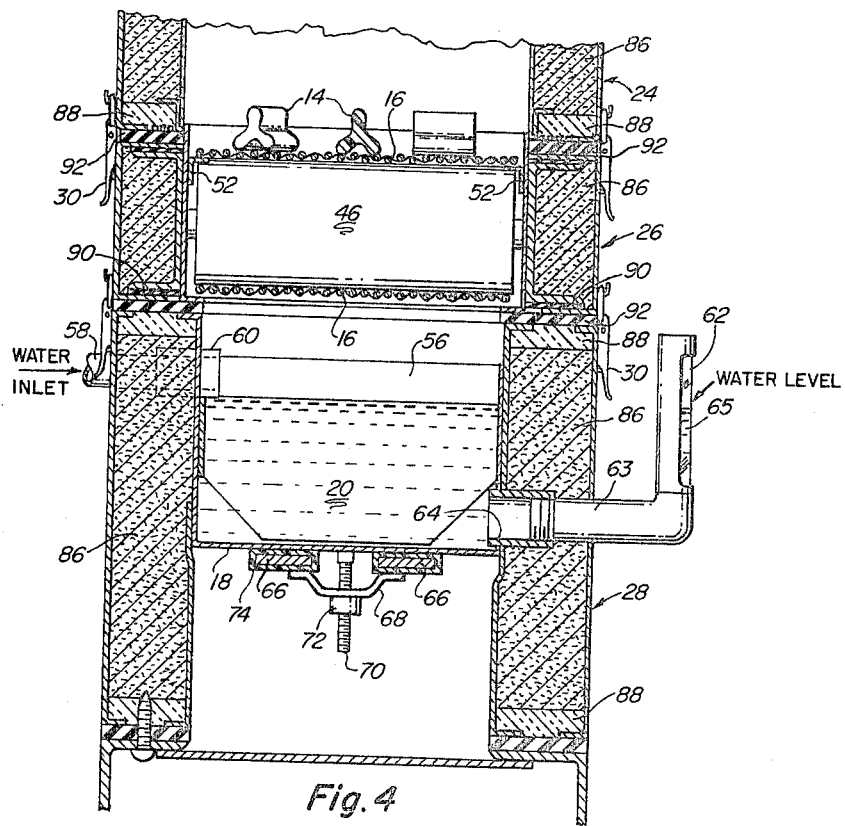
Fig. 4
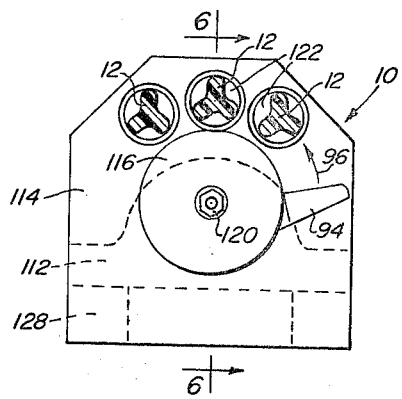
Fig. 5
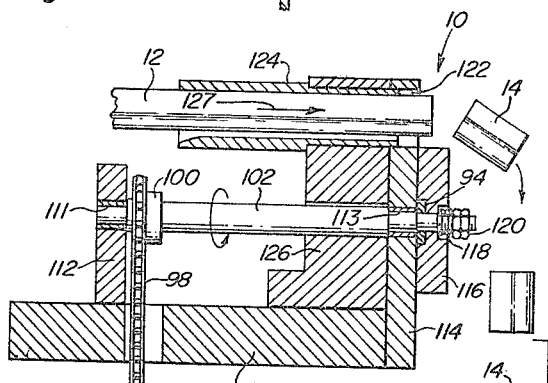
Fig. 6
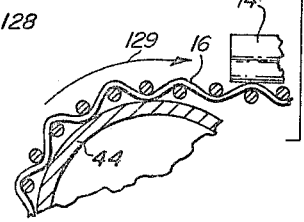
ROBERT E. HOLDEN
JAMES E. MORROW
INVENTORS.
BY
BUCKHORN, BLORE, KLARQUIST & SPARKMAN
ATTORNEYS United States Patent Office 3,281,895
Patented Nov. 1, 1966

3,281,895
APPARATUS FOR CUTTING AND EXPANDING PLASTIC MEMBERS
Robert E. Holden, Aloha, and James E. Morrow, Portland, Oreg., assignors to Tektronix, Inc., Beaverton, Oreg., a corporation of Oregon
Filed Nov. 9, 1964, Ser. No. 409,879
6 Claims. (Cl. 18—4)

The subject matter of the present invention relates generally to the cutting and expansion of plastic members, and in particular to an expander apparatus which conveys such plastic members through a housing containing steam at atmospheric pressure after such members are cut from one or more elongated strips of plastic material containing an expanding agent. The plastic strips are extruded to provide them with the proper cross sectional shape in the manner shown in co-pending U.S. patent application, Serial No. 247,469, now U.S. Patent 3,188,264, filed December 21, 1962 by Robert E. Holden, before such strips are fed through the cutter of the apparatus of the present invention. The plastic members expanded by the apparatus of the present invention have a foam-like cellular structure of low density and may be formed of interlocking configuration shown in the above-mentioned patent application so that such members may be used as loose fill packing material.

The present apparatus has several advantages of those previously employed including a simpler and less expensive construction which employs a boiler pan type steam generator to produce steam at atmospheric pressure directly within the housing where such steam is applied to the entire surface of the plastic members to heat such members substantially uniformly and cause them to expand to a foam-like cellular structure of low density. In addition, the expander apparatus of the present invention includes a cutter mechanism within the housing of such apparatus so that the speed of the cutter, as well as the speed of the plastic strips fed through such cutter, determines the rate at which the plastic members are fed to the conveyor transporting such members through the steam. This allows a continuous "in line" operation for producing expanded plastic members at a more uniform rate and prevents the plastic members from cooling after they are cut so that the heat remaining in such particles, as a result of their extrusion, is also used in the expansion of such members to provide a more efficient operation.

Another advantage of the apparatus of the present invention is its higher production capacity due at least in part to the use of a plurality of guides to enable several plastic strips to be moved simultaneously through the cutter mechanism after such strips have been formed by extrusion of the plastic through a corresponding number of orifices in the die of the extruder. In addition, the expander apparatus of the present invention is not subject to jamming or to feeding the plastic members through the expander in surges as is true in conventional expander apparatus employing pressurized steam to draw the members through a feeding tube from a hopper into the expansion chamber in the manner shown in the above-mentioned co-pending application, Serial No. 247,469. This suring also varies the amount of steam transmitted to the expansion chamber in such previous expander apparatus so that the temperature within such expansion chamber varies with the result that the plastic members are not expanded as uniformly as in the expander apparatus of the present invention. As a result of its improved construction, the expander apparatus of the present invention operates to produce expanded plastic members of a more uniform density in a less expensive and more trouble free manner.

It is therefore one object of the present invention to provide an improved apparatus for expanding plastic members in which steam generated at atmospheric pressure within such apparatus is employed to heat such members and cause them to expand.

Another object of the present invention is to provide an improved expander apparatus which includes a cutter mechanism for cutting extruded strips of plastic into short members and feeding such plastic members directly into the expansion chamber of such apparatus to enable a continuous "in line" operation to be employed to produce expanded plastic members and for more efficiently using the residual heat in the plastic members, as a result of the extrusion of the strips from which they are cut, to assist in their expansion.

A further object of the present invention is to provide an improved apparatus for expanding plastic members which has a greater production capacity and produces such members less expensively with a more uniform density that can be controlled in a simple and accurate manner.

An additional object of the present invention is to provide an improved expander apparatus of simple and inexpensive construction which operates in a more reliable manner to heat the plastic members more uniformly.

Still another object of the present invention is to provide an improved apparatus for expanding plastic members in which a foraminous conveyor belt is employed for transporting such plastic members over a pan of boiling water to heat such members with steam at atmospheric pressure and to control the density of the expanded members transmitted out of such apparatus by adjusting the speed of the conveyor belt so that such expanded members are of sufficiently low density to enable them to be used as loose fill packing material.

Other objects and advantages of the present invention will be apparent from the following detailed description of a preferred embodiment thereof and from the attached drawings of which:

FIG. 1 is a side elevation of one embodiment of the expander apparatus of the present invention with parts broken away to show the conveyor belt, the water container and other internal construction of such apparatus;

FIG. 2 is a plan view of the top of the apparatus of FIG. 1 with parts broken away to show the conveyor belt;

FIG. 3 is an elevation view of the front end of the apparatus of FIG. 1 with parts broken away for clarity;

FIG. 4 is a vertical section view taken along the line 4—4 of FIG. 1, shown on an enlarged scale;

FIG. 5 is an elevation view of the outlet end of the cutter mechanism employed in the expander apparatus of FIGS. 1 to 3, shown on an enlarged scale; and FIG. 6 is a vertical section view taken along the line 6—6 of FIG. 5 and also shows the relative position of the cutter mechanism and the conveyor belt.

As shown in FIG. 1, one embodiment of the expander apparatus of the present invention includes a cutter mechanism 10 for cutting one or more extruded strips 12 of plastic material containing an expanding agent into a plurality of short plastic members 14 which may be of the trilobular cross section shown in co-pending U.S. patent application, Serial No. 247,469, referred to above. A foraminous conveyor belt 16 is supported substantially horizontally over a container 18 of water 20. The input end of the conveyor is positioned beneath the cutter mechanism 10 to receive the cut plastic members 14, and its output end is positioned over a hopper 22 for delivering the plastic members into such hopper after such members have been expanded by the steam rising from the boiling water in such container.

The conveyor belt 16, the cutter mechanism 10 and the water container 18 are all enclosed within a heat insulated housing including a cover portion 24, an intermediate side portion 26 and a bottom portion 28 which are fastened together by releasable clamps 30. A frame 32 supports the housing, as well as the cutter mechanism, conveyor belt and water container, on legs which rest upon the floor 34. The cover portion 24 of the housing includes a flue or chimney 36 at the outlet end of such housing extending through the top of such cover portion in communication with the interior of the housing. The flue 36 is provided with a manually adjustable damper 38, as shown in FIG. 2, for varying the flow of air and steam through such flue by rotation of such damper. In addition, the cover portion 24 of the housing is formed with a separate front end portion 40 which is connected to the remainder of such cover portion by a hinge 42 to enable such front end portion to be pivoted away from the cutter mechanism 10 for easy servicing of such cutter mechanism.

The conveyor belt 16 is in the form of an endless mesh or chain of stainless steel or other rust-proof material, passing about a drive roller 44 at the front end of the housing and passing about an idler roller 46 at the rear end of such housing. The drive and idler rollers 44 and 46 are mounted on axles secured for rotation within the side portion 26 of the housing, and the drive roller is connected by means of a chain or belt drive 48 through the power take-off shaft of an electric motor 50 whose speed may be varied by means of a manual control and remains substantially constant for each control setting. As shown in FIG. 4, the upper side of the conveyor belt 16 slides along a pair of guide flanges 52 secured to the inner wall of the side portion 26 of the housing to prevent the belt from sagging. In addition, the idler roller 46 is adjustable by means of a pair of bolts 54 connected to move the opposite ends of the roller shaft to vary the distance between the drive roller and the idler roller in order to take up any slack and adjust the tension in the conveyor belt.

The water container 18 is in the form of an elongated rectangular pan having an opened top with a plurality of vertical baffle plates 56 welded or otherwise secured to the sides of such container in order to divide the container into a plurality of separate compartments. As shown in FIG. 4, an inlet pipe 58 is threaded into an inlet stub 60, extending through the side of the container 18 adjacent the top of one of the compartments in order to supply water for filling such container. After the container is filled with water, the inlet pipe 58 is closed by means of a float valve (not shown). A sight glass tube 62 is attached to the side of the container housing 28 and connected to the interior of the container by a pipe 63 threaded into a stub 64 at the bottom of one container compartment in order to visually indicate the water level in such container by the column 65 of water within such sight glass. The water 20 within the container 18 is heated by means of a plurality of electrical heating elements 66, shown in FIG. 4, which are held against the outer surface of the bottom of the container by means of a metal clamp 68 which is inserted over a threaded stud 70 welded to the bottom of such container and held in position by a nut 72 threaded on such stud. Of course, it is also possible to employ emersion type heating elements inside the water container. Each heating element 66 may be provided with a coating 74 of electrical insulating material to insulate the container and clamp from the source of electrical potential connected to such heating elements by means of a cable 76 inside a control box 78, shown in FIG. 1. The control box 78 also contains a pair of variable controls which may be manually adjusted by means of control knobs 80 and 82 to vary the speeds of the cutter motor and the conveyor motor independently of one another in order to change the length of the plastic members 14 and/or the time such members are in the expander. A plurality of temperature control circuits 84 are provided along with thermostat devices for sensing the temperature of the water in the container so that such thermostats determine when heating current flows through the heating elements and regulate the temperature of the water so that it is maintained at its boiling point. The container 18 is provided with a water outlet pipe 85 for draining the water out of such container by opening a valve 87 in such outlet pipe.

In order to prevent the operator of the expander apparatus of the present invention from being burned and to conserve heat, the housing of such apparatus is heat insulated by providing a filling of glass fibers or wool 86 within the hollow walls of such housing and by employing plates 88 of solid heat insulation such as linen board along the edges of the housing portions 24 and 28. In addition, the housing side portion 26 is provided with a pair of strips 90 of heat insulation material between the inner and outer wall members to insulate such wall members from each other. A pair of rubber gaskets 92 are provided between the upper edge of housing portion 28 and the lower edge of housing portion 26, and between the upper edge of housing portion 26 and the lower edge of housing portion 24 in order to provide steam-tight seals between such housing portions. However, the housing is open to the atmosphere at the front end adjacent the cutter mechanism 10 and at the rear end adjacent the hopper 22 so that the steam within such housing is at atmospheric pressure. In addition, the setting of the damper 38 in the flue 36 controls the flow of air and steam through such housing in order to maintain a more uniform temperature within such housing.

As shown in FIGS. 5 and 6, the cutter mechanism 10 includes a knife blade 94 which may be rotated in the counterclockwise direction of arrow 96 in FIG. 5 or in the opposite direction if such blade is turned over, or a cutting edge is provided on both sides of the blade, by means of a chain 98 which drives a sprocket 100 upon a shaft 102 to which such knife blade is attached. As shown in FIG. 3, the chain 98 is driven by means of an electric motor 104 of substantially constant speed whose power take off shaft is connected to an idler sprocket 106 by means of another chain 108. The drive chain 98 is connected to another sprocket on the same shaft as idler sprocket 106 so that such chain rotates shaft 102 when the motor 104 causes chain 108 to rotate the idler sprocket. An adjustable roller member 110 is provided in engagement with the drive chain 98 in order to adjust the tension in such drive chain. The shaft 102 is mounted within a bearing sleeve 111 through a hole in a support plate 112 at one end of such shaft, while the other end of the shaft is similarly mounted in bearing 113 through another support plate 114, as shown in FIG. 6. The knife blade 94 is keyed to the right end of the shaft 102 by providing such end with a square cross section and resiliently urged to the left by means of a bearing plate 116 also keyed to such shaft and engaged by a coil spring 118. The spring is prevented from moving to the right by a pair of lock nuts 120 threaded on to that end of shaft 102.

The knife blade 94 is rotated across three circular apertures 122 provided through the support plate 114 positioned along an arcuate path about shaft 102 in alignment with three guide tubes 124 which are supported by means of a support block 126 on a base plate 128. The support block 126 is provided with three passageways to enable the insertion of the guide tubes 124 through such passageways into openings 122 and is provided with a clearance hole for the shaft 102. Three extruded plastic strips 12 of the trilobular cross section, shown in FIG. 5, or some other suitable cross section are moved through the guides 124 in the direction of arrow 127 by means of a plurality of puller rollers or conveyors (not shown) positioned on opposite sides of such strips so that the strips are cut into a plurality of short plastic members 14 by the scissors cutting action of the knife blade 14 moving across the apertures 122 in the support plate 114.

After the plastic members are cut, they fall down onto the conveyor belt 116 which is moved in the direction of arrow 129 by drive roller 44 to carry such members away from the cutter over the boiler pan container 18 and through the housing before dumping them into the hopper 22. In addition to retaining the heat remaining in the plastic particles 14 due to the extrusion process, the hinged housing portion 40 surrounding the cutter also serves as a shield to deflect the plastic members so that they fall on the conveyor belt since they tend to fly off in many directions during cutting.

After the expanded plastic members 14 are deposited within the hopper 22, they are transported from such hopper by means of a blower 130 mounted on frame 32, through an outlet tube 132 in the bottom of such hopper. Thus, the air driven through the outlet tube 132 in alignment with the mouth of the blower sucks the plastic members 14 out of the hopper 22 through such outlet tube to a remotely positioned storage bin for aging. The hopper 22 may be provided with a hinged door 134 having a magnetic catch to hold such door normally closed but to allow access to the interior of the hopper for cleaning. Also, the hopper may be provided with a water outlet tube (not shown) in the bottom of the hopper to enable any accumulation of water, due to condensation, to be drained from the hopper.

It should be noted that in addition to the hinged housing portion 40 which enables quick access to the cutter mechanism 10 for cleaning such mechanism, the entire housing cover portion 24 may be removed as well as the housing side portion 26 merely by releasing the snap clamps 30 holding such housing portions together. This enables easy cleaning and maintenance of the conveyor belt also so that the expander apparatus of the present invention is able to operate in an extremely reliable manner for long periods of time.

It will be obvious to those having ordinary skill in the art that many changes may be made in the details of the above-described preferred embodiments of the present invention. For example, the cutter mechanism may be positioned outside the housing, the conveyor belt may be replaced by some other conveying device such as a rotating foraminous disc, and the blower 130 may be eliminated if the expanded plastic members are allowed to drop directly by gravity into the storage bin. Therefore the scope of the present invention should only be determined by the following claims.

We claim:

1. Apparatus for cutting and expanding plastic elements, comprising:
   a container for holding water;
   heater means for heating the water in said container to produce steam at atmospheric pressure;
   a housing covering at least the top of said container to confine at least a portion of said steam within the housing at atmospheric pressure; and
   conveyor means for continuously moving a plurality of separate plastic elements through said housing simultaneously to expose said elements to the steam within said housing for a predetermined time and cause the elements to expand substantially uniformly; and
   means for cutting said plastic elements from at least one strip of plastic material and for feeding said plastic elements onto said conveyor means.

2. Apparatus for manufacturing loose fill packing material in the form of elements of expanded plastic, comprising:
   a container for holding water having an open top;
   heater means for heating the water in said container to produce steam at atmospheric pressure;
   a housing covering at least the top of said container so that said steam is generated within the housing at atmospheric pressure, said housing having an opening for enabling the flow of steam out of said housing;
   conveyor means for continuously moving a plurality of separate plastic elements through said housing simultaneously to expose said elements to the steam within said housing for a predetermined time and cause the elements to expand substantially uniformly; and
   cutter means including a rotatable knife blade positioned adjacent the inlet of the conveyor means to cut said elements from at least one elongated strip of plastic material containing an expanding agent and said elements to be transmitted onto said conveyor means at a uniform rate determined by the speed of said knife blade and the speed said plastic strip is fed into said cutter means.

3. Apparatus for manufacturing loose fill packing material in the form of expanded plastic elements having a foam-like cellular structure, comprising:
   a container for holding water having an open top;
   heater means for heating the water in said container to emit steam at atmospheric pressure from said container;
   a housing covering at least the top of said container so that said steam is generated within the housing at atmospheric pressure;
   conveyor means including a foraminous belt supported beneath said cutter means to receive the plastic elements from said cutter means, for simultaneously moving a plurality of separate plastic elements through said housing to expose said elements to the steam within said housing for a predetermined time and cause the elements to expand substantially uniformly;
   a cutter means positioned adjacent the inlet of the conveyor means to cut said elements from a plurality of elongated strips of plastic material containing an expanding agent and cause said elements to be transmitted onto said conveyor means; and
   blower means positioned adjacent the outlet of said conveyor to transmit the expanded elements away from said housing.

4. Apparatus for manufacturing expanded plastic members, comprising:
   an elongated container for holding water having an open top;
   a plurality of heating elements supported adjacent the bottom of the container to heat the water in said container and produce steam at atmospheric pressure;
   a heat insulated housing supported over the top of said container to hold the steam within the housing at atmospheric pressure, said housing having a front end portion pivotally mounted on the remainder of said housing and a flue at the rear end of said housing for controlling the flow of steam out of said housing;
   cutter means mounted adjacent said front end of said housing including a rotatable knife blade and a plurality of guide tubes supported adjacent said blade to direct a plurality of strips of plastic material containing an expanding agent into the path of said blade to cut each of said strips into a plurality of members;
   conveyor means including an endless conveyor belt supported inside said housing over the top of said container so that said belt is heated by the steam for receiving the plastic members dropped from said cutter means on the inlet end of said conveyor means and for moving said members through said housing to expose the member to the steam within said housing for a predetermined time and cause the members to expand substantially uniformly;
   hopper means positioned at the outlet end of said conveyor means to catch the members dropped from said belt and having an outlet opening at the bottom of said hopper with a delivery tube connected to said outlet opening; and a blower means connected to the bottom of said hopper for forcing air out of its outlet opening and through the delivery tube for removing the expanded members from said hopper means.

5. Apparatus for manufacturing expanded plastic members, comprising:
   an elongated container for holding water having an open top and a plurality of baffles within said container;
   a plurality of electrical heating elements supported adjacent the bottom of the container;
   temperature control means connected to said heating elements for maintaining the temperature of said water above its boiling point to produce steam at atmospheric pressure;
   a heat insulated housing supported over the top of said container to hold the steam within the housing at atmospheric pressure, said housing having a front end portion pivotally mounted on the remainder of said housing and a flue at the rear end of said housing for controlling the flow of steam out of said housing;
   cutter means mounted within said front end of said housing, including a rotatable knife blade and a plurality of guide tubes supported adjacent said blade to direct a plurality of strips of plastic material containing an expanding agent into the path of said blade to cut each of said strips into a plurality of members;
   conveyor means including an endless foraminous conveyor belt supported inside said housing over the top of said container so that said belt is heated by the steam for receiving the plastic members dropped from said cutter means on the inlet end of said conveyor means and for moving said members through said housing to expose the member to the steam within said housing for a predetermined time and cause the members to expand substantially uniformly;
   hopper means positioned at the outlet end of said conveyor means to catch the members dropped from said belt and having an outlet opening at the bottom of said hopper with a deliver tube connected to said outlet opening; and
   a blower means connected to the bottom of said hopper for forcing air out of its outlet opening and through the delivery tube for removing the expanded members from said hopper means.

6. Apparatus for manufacturing expanded plastic members, comprising:
   an elongated container for holding water having an open top and a plurality of baffles within said container;
   a plurality of electrical heating elements supported outside the container adjacent the bottom thereof;
   temperature control means connected to said heating elements for maintaining the temperature of said water above its boiling point to produce steam at atmospheric pressure;
   a heat insulated housing supported over the top of said container to hold the steam within the housing at atmospheric pressure, said housing having a front end portion pivotally mounted on the remainder of said housing and a flue at the rear end of said housing for controlling the flow of steam out of said housing;
   cutter means mounted within said front end of said housing, including a rotatable knife blade and a plurality of guide tubes supported adjacent said blade to direct a plurality of strips of plastic material containing an expanding agent into the path of said blade to cut each of said strips into a plurality of members;
   a first drive means for rotating said blade at a substantially constant speed;
   conveyor means including an endless conveyor belt of rust resistant metal mesh supported inside said housing over the top of said container so that said belt is heated by the steam for receiving the plastic members dropped from said cutter means on the inlet end of said conveyor means and for moving said members through said housing to expose the members to the steam within the housing for a predetermined time and cause the members to expand substantially uniformly;
   a second drive means for moving said belt at a substantially constant speed;
   hopper means positioned at the outlet end of said conveyor means to catch the members dropped from said belt and having an outlet opening at the bottom of said hopper with a delivery tube connected to said outlet opening;
   a blower means connected to the bottom of said hopper for forcing air out of its outlet opening and through the delivery tube for removing the expanded members from said hopper means; and
   means for independently adjusting the speeds of said first and second drive means in order to independently vary the length of the plastic members and the time said plastic members are exposed to the steam within said housing.

References Cited by the Examiner

UNITED STATES PATENTS

| | | | |
|---|---|---|---|
| 1,311,613 | 7/1919 | Munger | 18—6 |
| 1,821,689 | 9/1931 | Broeg. | |
| 1,926,313 | 9/1933 | Smith | 99—404 X |
| 2,097,885 | 11/1937 | Koppe | 18—1 |
| 2,125,001 | 7/1938 | Cowen et al. | 18—6 X |
| 2,249,792 | 7/1941 | Skinner. | |
| 2,375,827 | 5/1945 | Slaughter. | |
| 2,383,989 | 9/1945 | Pilcher | 18—4 |
| 2,600,306 | 6/1952 | Lipscomb | 25—142 |
| 2,607,074 | 8/1952 | Slaughter | 18—4 |
| 2,827,661 | 3/1958 | Von Kohorn | 18—4 X |
| 2,975,470 | 3/1961 | Snelson et al. | 18—6 X |
| 2,998,501 | 8/1961 | Edberg et al. | 18—4 X |
| 3,091,833 | 6/1963 | Kovach | 25—142 X |

FOREIGN PATENTS 263,870  11/1927  Great Britain.

WILLIAM J. STEPHENSON, *Primary Examiner.*